(12) United States Patent
Chang et al.

(10) Patent No.: US 9,369,969 B2
(45) Date of Patent: Jun. 14, 2016

(54) SYSTEM AND METHOD TO MITIGATE INTERFERENCE OF 3GPP LTE HETEROGENEOUS NETWORK ACCORDING TO PRIORITY OF SERVICE

(71) Applicant: INTELLECTUAL DISCOVERY CO., LTD., Seoul (KR)

(72) Inventors: Kyung Hi Chang, Seoul (KR); Zeeshan Kaleem, Incheon (KR); Bing Hui, Incheon (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 96 days.

(21) Appl. No.: 14/229,262

(22) Filed: Mar. 28, 2014

(65) Prior Publication Data

US 2014/0293906 A1 Oct. 2, 2014

(30) Foreign Application Priority Data

Mar. 29, 2013 (KR) .......................... 10-2013-0034087

(51) Int. Cl.
*H04W 52/24* (2009.01)
*H04W 52/14* (2009.01)
*H04W 52/28* (2009.01)
*H04W 24/02* (2009.01)

(52) U.S. Cl.
CPC ............ *H04W 52/24* (2013.01); *H04W 52/143* (2013.01); *H04W 52/244* (2013.01); *H04W 52/247* (2013.01); *H04W 52/281* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 2010/0035628 A1* | 2/2010 | Chen et al. | 455/452.2 |
| 2010/0144317 A1* | 6/2010 | Jung et al. | 455/411 |
| 2011/0069659 A1* | 3/2011 | Kong et al. | 370/328 |
| 2011/0105110 A1* | 5/2011 | Carmon et al. | 455/422.1 |
| 2014/0341093 A1* | 11/2014 | Seo | 370/280 |

FOREIGN PATENT DOCUMENTS

JP 2012253631 A * 12/2012

* cited by examiner

*Primary Examiner* — Ian N Moore
*Assistant Examiner* — Justin T Van Roie
(74) *Attorney, Agent, or Firm* — Sughrue Mion, PLLC

(57) ABSTRACT

A power control system and method to mitigate interference in a heterogeneous network is provided. A power control method to mitigate interference may include: receiving a link connection request from a femto terminal; transmitting a downlink signal when the link connection request is allowed; receiving information of a macro terminal present around a femto base station; controlling a power of the downlink signal in response to a high interference indicator (HII) report being included in the received information of the macro terminal; and controlling the power of the downlink signal based on a priority of service while satisfying predetermined constraints, in response to the HII report in a state in which the power of the downlink signal is decreased up to a predetermined required power.

15 Claims, 6 Drawing Sheets

SYSTEM AND METHOD TO MITIGATE INTERFERENCE OF 3GPP LTE HETEROGENEOUS NETWORK ACCORDING TO PRIORITY OF SERVICE

CROSS-REFERENCE TO RELATED APPLICATION

This application claims the priority benefit of Korean Patent Application No. 10-2013-0034087, filed on Mar. 29, 2013, in the Korean Intellectual Property Office, the disclosure of which is incorporated herein by reference.

BACKGROUND

1. Field of the Invention

Embodiments relate to a method and system to mitigate interference in a long term evolution (LTE) heterogeneous network including a femtocell and a macrocell by controlling a power based on a priority of service.

2. Description of the Related Art

Locating a transmission end and a reception end to be adjacent to each other is most efficient to improve a capacity of a wireless communication system. A femtocell technology may be an efficient method capable of achieving effects in terms of cost.

The femtocell technology has potential advantages in view of expansion of indoor coverage, energy efficiency, and cost and thus, has been applied to a high speed wireless communication system. Also, a femtocell has been adopted as one of the principal functions of a long term evolution (LTE) system. An LTE femtocell may use all the bands defined in 3rd Generation Partnership Project (3GPP) and may not require an exclusive frequency band. However, due to such reasons, critical co-channel interference (CCI) may occur between a macrocell and a femtocell.

In detail, due to expendability, security, and the limited availability of a backhaul band, substantial interference issues may arise between two hierarchical networks. That is, in view of social communication based or spectrum availability, it may be more effective to use both a macrocell base station and a femtocell base station on the same spectrum. However, to this end, a channel needs to be shared between two hierarchies, which may cause serious interference in a shared channel. Recently, proposed are many methods for solving such interference that may occur in a network in which a femtocell and a macrocell coexist.

Meanwhile, major requirements for a macrocell may be to enable a user to perform communication without using a separate device at any time and at any place, or even during a travel. Many users may be provided with a communication service from each macrocell base station and thus, the communication capacity of the macrocell needs to be preferentially secured compared to the communication capacity of a femtocell. Although inter-layer interference is present against the femtocell, a minimum target signal-to-interference noise ratio (SINR) of a macrocell user may need to be satisfied.

To this end, an amount of power to be decreased at the femtocell needs to be known to satisfy a target SINR of the macrocell user. A relatively small amount of time needs to be used during a process of processing an interference mitigation/cancellation algorithm. Further, an interference mitigation/cancellation method having simple complexity is required to possibly minimize latency. Also, when performing interference mitigation/cancellation, a combination with another resource management is required, such as power and subchannel allocation.

As described above, a femtocell may need to be capable of performing a plurality of measurements in order to be provided with sufficient information for interference mitigation/cancellation between two hierarchical networks and at the same time, to maintain coverage of the femtocell.

For example, a current LTE technology report proposes a variety of options as to an information exchange method between a macrocell and a femtocell. For example, there are an information exchange method using direct broadcasting between a macrocell base station and a femtocell base station, an information exchange method using broadcasting between a macrocell base station and a femtocell base station through a user terminal, an information exchange method between a macrocell base station and a femtocell base station through an X2 based interface that is a signaling protocol between base stations, and an information exchange method between a macrocell base station and a femtocell base station and between femtocell base stations through an S1 based interface that is a signaling protocol between a base station and a gateway.

In this regard, Korean Laid-Open Publication No. 10-2009-0127908, titled "Method and apparatus for controlling interference of base station", discloses a method and apparatus for controlling interference of a femtocell base station using an existing X2 interference control message, instead of newly defining an interference control message in an S1 interface, by converting, to a format based on a protocol of the S1 interface, an X2 interference control message used for an X2 interface and by transmitting the converted X2 interference control message through the S1 interface, in order to control interference occurring in a femtocell environment in which the X2 interface is absent.

SUMMARY

Embodiments provide a power control method and system to mitigate interference in which when a femto base station receives a high interference indicator (HII) report of a macro terminal in a heterogeneous network, the femto base station may control a transmission power of a downlink signal of the femto base station.

Embodiments also provide a power control method and system to mitigate interference in which a femto base station may decrease a transmission power of a downlink signal to mitigate interference against a macro base station.

Embodiments also provide a power control method and system to mitigate interference in which a femto base station may decrease a transmission power of a downlink signal by a predetermined step.

Embodiments also provide a power control method and system to mitigate interference in which a femto base station may control a transmission power based on a priority of service to enhance the entire quality of service (QoS).

According to an aspect of embodiments, there is provided a power control method to mitigate interference in a heterogeneous network, performed at a femto base station, the method including: receiving a link connection request from a femto terminal; transmitting a downlink signal when the link connection request is allowed; receiving information of a macro terminal present around the femto base station; controlling a power of the downlink signal in response to a high interference indicator (HII) report being included in the received information of the macro terminal; and controlling the power of the downlink signal based on a priority of service while satisfying predetermined constraints, in response to the HII report in a state in which the power of the downlink signal is decreased up to a predetermined required power.

The controlling the power of the downlink signal in response to the HII report may include decreasing the power of the downlink signal by a predetermined first unit magnitude in response to the HII report.

The controlling the power of the downlink signal based on the priority of service may include: comparing a priority of service of the macro terminal and a priority of service of the femto terminal; and decreasing the power of the downlink signal when the priority of service of the macro terminal is above the priority of service of the femto terminal.

The decreasing the power of the downlink signal may include decreasing the power of the downlink signal by a predetermined second unit magnitude.

The decreasing the power of the downlink signal may include decreasing the power of the downlink signal by a predetermined second unit magnitude that is less than or equal to a predetermined first unit magnitude.

The power control method may further include increasing the power of the downlink signal when a channel quality indicator (CQI) value in the received information of the macro terminal increases.

The controlling the power of the downlink signal based on the priority of service may include decreasing the power of the downlink signal until a signal-to-interference and noise ratio (SINR) constraint among the predetermined constraints is satisfied.

The receiving the link connection request may include allowing the link connection request when the femto terminal is verified to be registered to a closed subscriber group (CSG).

The receiving information of the macro terminal may include receiving information of the macro terminal through a macro base station.

According to another aspect of embodiments, there is provided a power control system to mitigate interference in a heterogeneous network, the power control system including: a macro base station configured to transmit information of a macro terminal to a femto base station; the macro terminal connected to the macro base station and configured to report a channel state of a downlink to the macro base station using a CHI; a femto terminal configured to transmit a link connection request to the femto base station; and the femto base station configured to transmit a downlink signal at a maximum power when the link connection request is allowed, and to control a power of the downlink signal based on a priority of service while satisfying predetermined constraints, in response to a high interference indicator (HII) report that is included in information of the macro terminal.

When the macro terminal is not registered to a closed subscriber group (CSG) and when interference from the femto base station is greater than or equal to a threshold, the macro terminal may be configured to transmit the HII report to the macro base station.

When a priority of service of the macro terminal is above a priority of service of the femto terminal, the femto base station may be configured to decrease the power of the downlink signal.

When a priority of service of the macro terminal is above a priority of service of the femto terminal, the femto base station may be configured to decrease the power of the downlink signal by a predetermined second unit magnitude.

When a CQI value in information of the macro terminal increases, the femto base station may be configured to increase the power of the downlink signal.

The femto base station may be configured to decrease the power of the downlink signal until an SINR among the predetermined constraints is satisfied.

When the femto terminal is verified to be registered to a CSG, the femto base station may be configured to allow the link connection request.

In response to the HII report, the femto base station may be configured to decrease the power of the downlink signal by a predetermined first unit magnitude.

According to still another aspect of embodiments, there is provided a non-transitory computer-readable storage medium storing at least one program including instructions, to implement a power control method to mitigate interference in a heterogeneous network.

EFFECTS

According to embodiments, it is possible to maximize a data yield of the entire system by minimizing downlink interference from a neighboring femto base station to a macro terminal located around the femto base station.

According to embodiments, it is possible to simultaneously guarantee interference mitigation and quality of service (QoS) in such a manner that a femto base station applies, as a criterion, a priority of service to a power control procedure among self organizing network (SON) functions.

In a specific case, it is possible to enhance QoS of the entire system by sacrificing a user terminal having a relatively low priority of service between a macro terminal, for example, a macro user equipment (MUE) and a femto terminal, for example, a femto user equipment (FUE).

According to embodiments, it is possible to minimize interference occurring in a heterogeneous network by applying an effective power control procedure to various types of services.

BRIEF DESCRIPTION OF THE DRAWINGS

These and/or other aspects, features, and advantages of the embodiments will become apparent and more readily appreciated from the following description of exemplary embodiments, taken in conjunction with the accompanying drawings of which.

DETAILED DESCRIPTION

Figure 1:
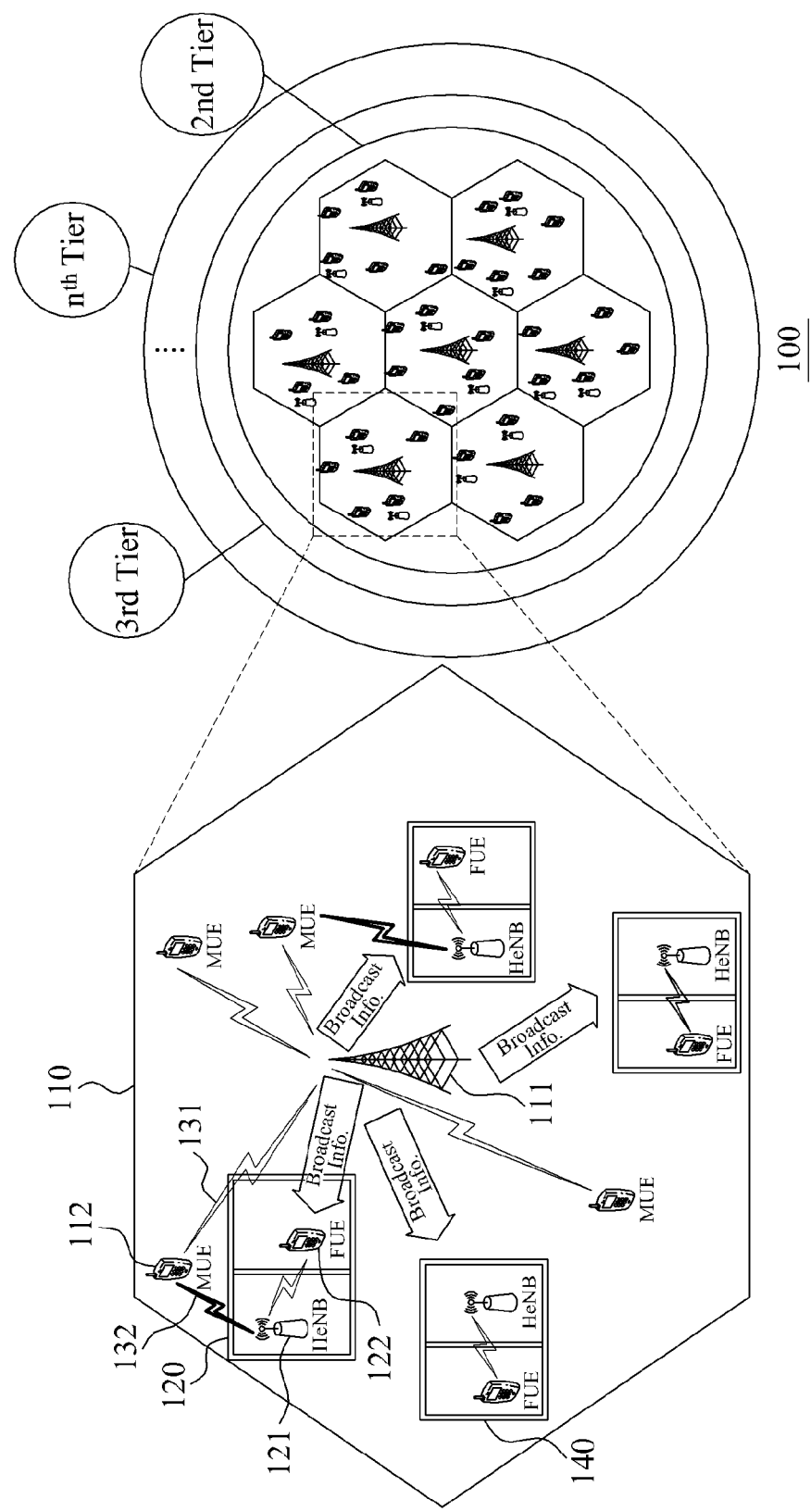
FIG. 1 illustrates an example of interference in a 3rd Generation Partnership Project (3GPP) long term evolution (LTE) heterogeneous network environment according to an embodiment.

Reference will now be made in detail to exemplary embodiments, examples of which are illustrated in the accompanying drawings, wherein like reference numerals refer to like elements throughout. Exemplary embodiments are described below to explain the present disclosure by referring to the figures.

Currently, regarding a long term evolution (LTE) system, a home femtocell installed within a house and an indoor femtocell to assist a hotspot in a building may be developed and commercialized. Also, it is possible to cope with heavy increases in wireless data of many hotspots by additionally expanding the application range of technology to a street-level femtocell.

Such femtocell technology may be effective in terms of enhancement in a cell yield, expansion of cell coverage, energy efficiency, and cost. Thus, a femtocell may be adopted as one of the principal network constituent elements in an LTE system. For example, the femtocell may be commercialized in a further evolved form in an LTE-Advanced system that is a fourth generation mobile communication system following the LTE system.

Here, an LTE femtocell may use all the bands defined in a 3rd Generation Partnership Project (3GPP) and may not require an exclusive femtocell frequency band, which may cause critical co-channel interference (CCI) between femtocells.

For example, in an LTE environment, particularly, in a downlink of a hierarchical network in which a macro base station, for example, an evolved node base (eNB) and a femto base station, for example, a home evolved node base (HeNB) coexist, interference may arise from effect from the femto base station against a macro terminal, for example, a macro user equipment (MUE). Also, the entire bandwidth is shared between femtocells and thus, when the same channel is reused between neighboring femtocells, interference may occur, which may lead to degrading the performance of a system.

Accordingly, technology capable of managing CCI in view of frequency division and time division of resources and power allocation is required to control CCI in a network in which a femtocell is present.

A method and system to mitigate interference in a heterogeneous network may be applied to all the mobile communication systems configured in different networks having different cell coverage. For example, the method and system may be effective in all the services supported in a heterogeneous network including a macrocell and a femtocell in an LTE system. Here, the services may refer to a variety of services having different priority of service, for example, requirements for a packet error rate (PER) and latency.

In detail, L1 of a femto base station system may collect necessary information and configure a power control procedure that is one of self-organizing network (SON) functions on L2 and L3 software. In addition, a power control procedure according to an embodiment may be employed in any country in which an LTE system providing a variety of services such as voice, video, a runtime service, and a best service is commercialized.

Throughout the specification and the accompanying drawings, a user terminal and a user equipment (UE) may be interchangeably used, a macro base station and an evolved node base (eNB) may be interchangeably used, a femto base station and a home evolved node base (HeNB) may be interchangeably used, a macro terminal and a macro user equipment (MUE) may be interchangeably used, and a femto terminal and a femto user equipment (FUE) may be interchangeably used.

Hereinafter, embodiments are described with reference to the accompanying drawings.

FIG. 1 illustrates an example of interference 132 in a 3GPP LTE heterogeneous network environment 100 according to an embodiment. Referring to FIG. 1, an interference circumstance may be under a heterogeneous network including a macro base station 111, a femto base station 121, a macro terminal 112, and a femto terminal 122 in a 3GPP LTE. According to an embodiment, the macro base station 111 and the macro terminal 112 may be connected to each other through a wireless link 131.

For example, a femtocell 120 may use all the bands defined in 3GPP and may not require an exclusive frequency band for the femtocell 120. Accordingly, critical CCI may occur between a macrocell 110 and the femtocell 120, and between femtocells 120 and 140.

Further, a macro system and a femto system may use a global band instead of using a partial band based on a frequency division. Since a global band frequency is used, the interference 132 from the femto base station 121 against the macro terminal 112 in a downlink may be minimized through a power control method and system to mitigate interference in a heterogeneous network according to an embodiment.

According to an embodiment, the femto terminal 122 registered to the femto base station 121 may be assumed as a closed subscriber group (CSG) capable of using the corresponding femto base station 121. Accordingly, the macro terminal 112 that is not registered to the femto base station 121 and located to be around the femto base station 121 may receive the interference 132, for example, downlink interference from the neighboring femto base station 121.

According to an embodiment, the femto base station 121 may include a downlink receiver configured to perform functionalities, such as a network listen mode (NLM), a radio environment measurement (REM), and an HeNB sniffer. The femto base station 121 may obtain control channel information that is broadcast from the macro base station 111 to the macro terminal 112 through the downlink receiver.

According to an embodiment, the femto base station 121 may include an uplink receiver configured to receive information of the macro terminal 112, for example, a high interference indicator (HII) report that is transmitted from the macro terminal 112 in an interference circumstance to the macro base station 111.

Figure 2:
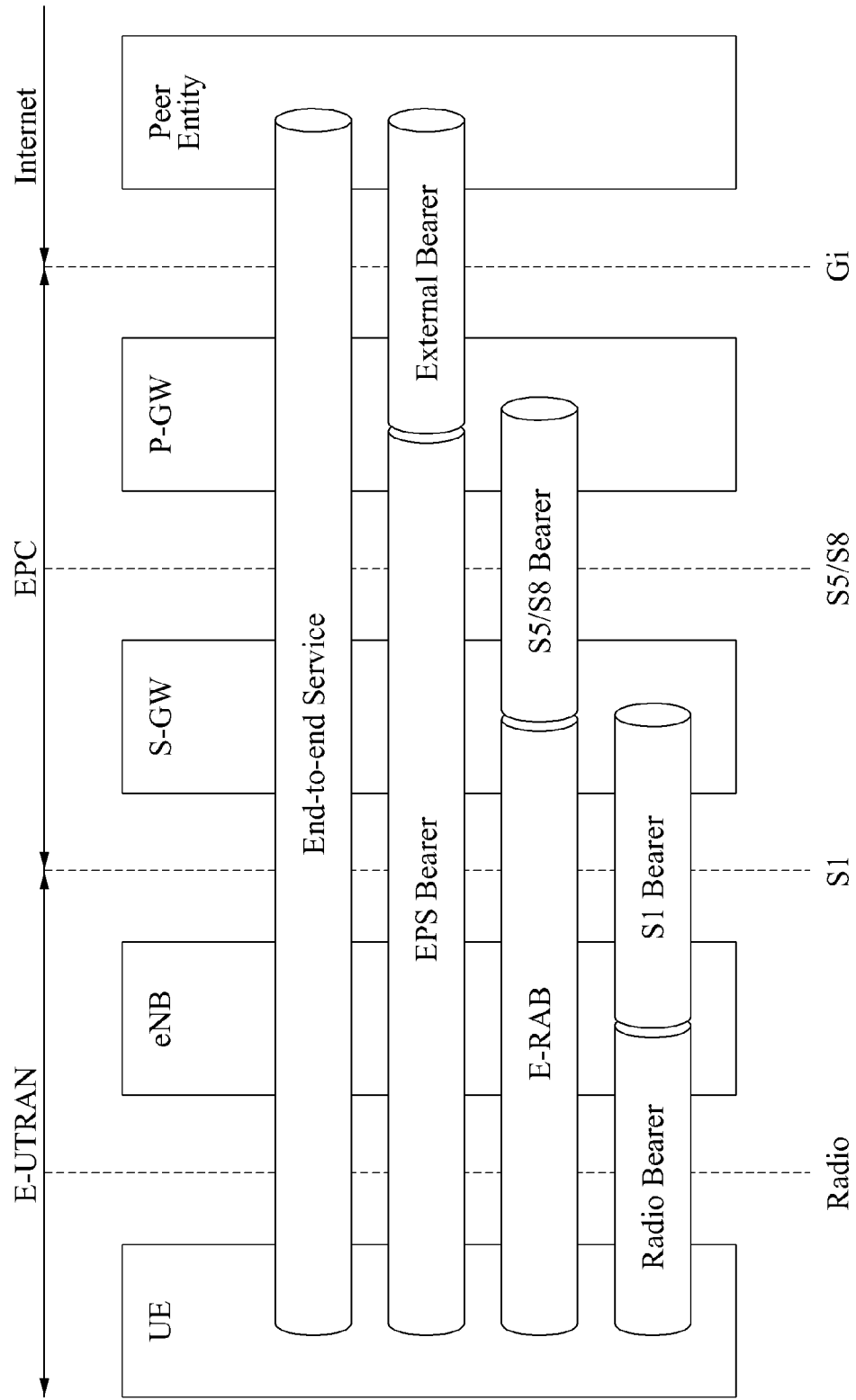
FIG. 2 illustrates an example of an evolved packet system (EPS) bearer service structure according to an embodiment.

FIG. 2 illustrates an example of an evolved packet system (EPS) bearer service structure according to an embodiment. A priority of service of a user terminal may be defined by a macro base station that refers to a bearer service structure of FIG. 2. The defined priority of service may be used to classify a service based on a QoS class identifier (QCI) as expressed by Table 1.

Figure 3:
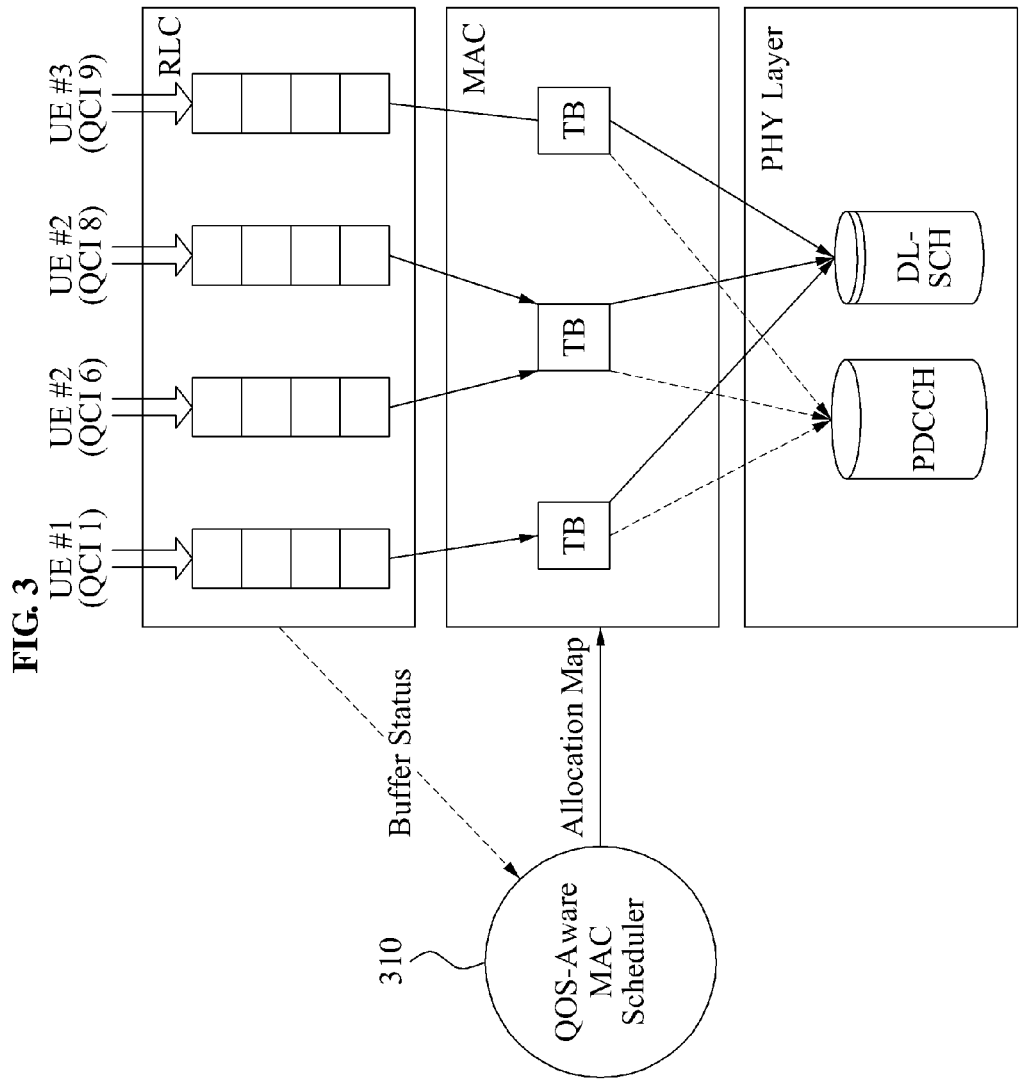
FIG. 3 illustrates an example of quality of service (QoS) based scheduling in an LTE downlink according to an embodiment.

FIG. 3 illustrates an example of QoS based scheduling in an LTE downlink according to an embodiment. Here, a macro base station may have information on a bearer model used by a user terminal through a QoS-aware scheduler media access control (MAC) scheduler 310 provided in the macro base station.

Figure 4:
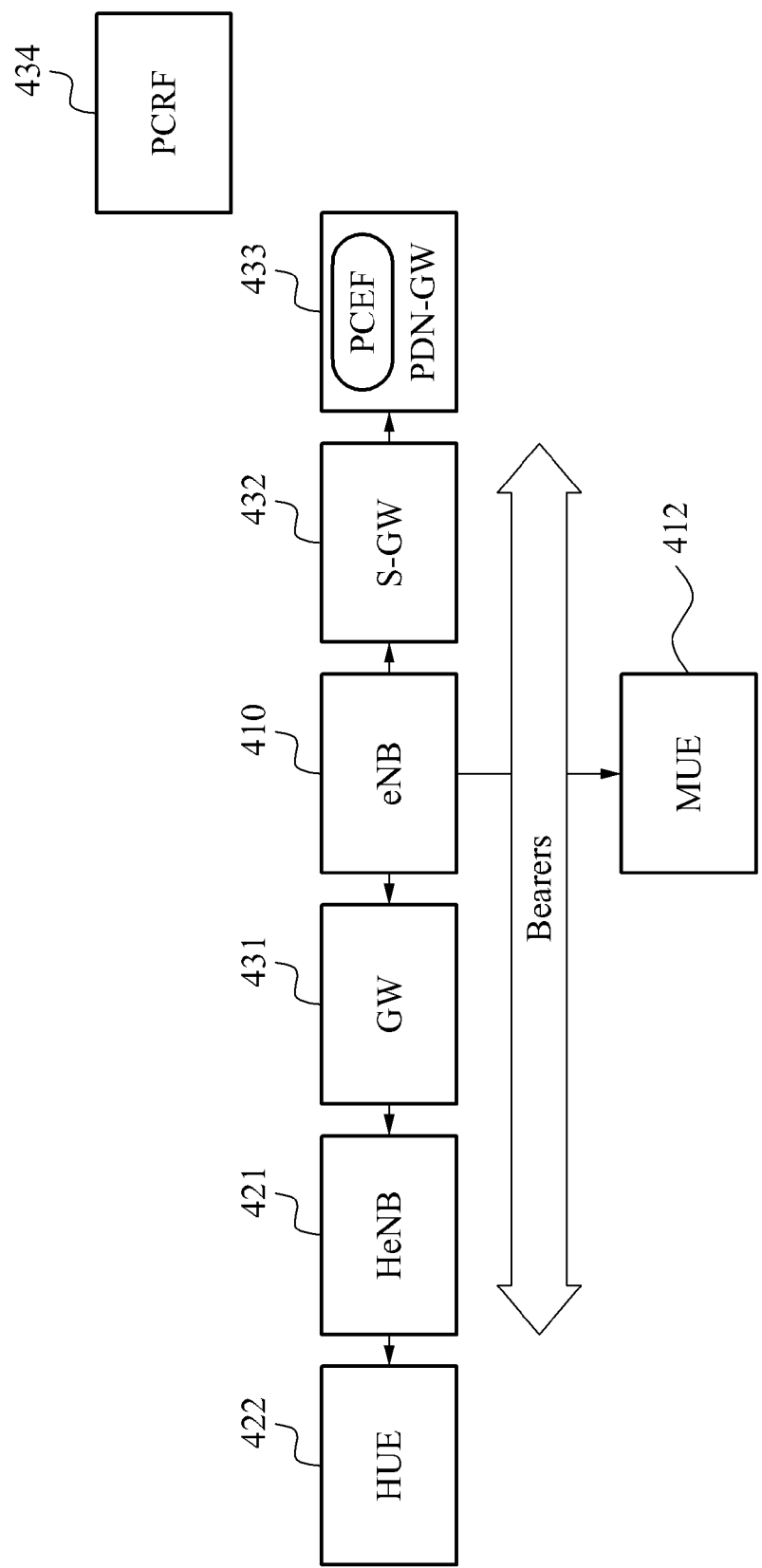
FIG. 4 illustrates a functional block within a 3GPP policy and charging control (PCC) framework according to an embodiment.

FIG. 4 illustrates a functional block within a 3GPP policy and charging control (PCC) framework according to an embodiment. In a bearer service structure according to an embodiment, traffic having different QoS requirements may be classified. Referring to FIG. 4, a policy control resource function (PCRF) 434 refers to a policy server within an evolved packet core (EPC). A policy and charging enforcement function (PCEF) may refer to a function of making a policy decision based on a PCC rule. For example, a packet data network gateway (PDN-GW) 433 may perform the PCEF.

Hereinafter, a macro base station eNB 410 and a femto base station HeNB 421 will be described. For example, a home user terminal HUE 422 may include a femto terminal in the present specification and the macro base station eNB 410 may broadcast information to a macro terminal MUE 412. Here, a gateway GW 431 may perform a general gateway functionality and a serving gateway S-GW 432 may perform an anchoring functionality for terminality movement between macro base stations and between a 3GPP network and an E-UTRAN.

Figure 5:
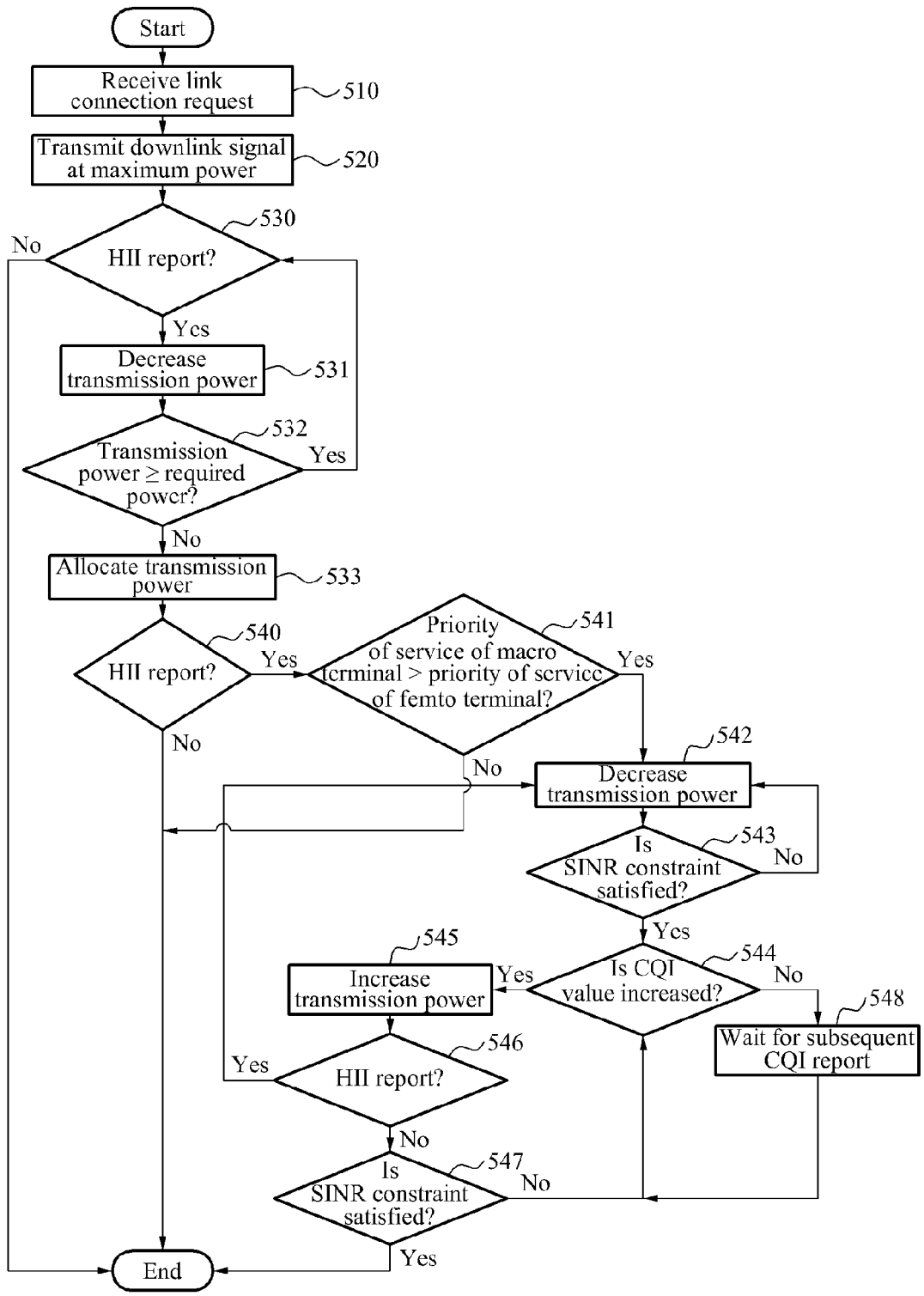
FIG. 5 is a flowchart illustrating a method to mitigate interference in a heterogeneous network according to an embodiment.

FIG. 5 is a flowchart illustrating a method to mitigate interference in a heterogeneous network according to an embodiment. Here, a femto base station may control a power to mitigate interference as follows.

In operation 510, the femto base station may receive a link connection request from a femto terminal. When the femto terminal having transmitted the link connection request is present in a CSG list, the femto terminal and the femto base station may be connected to each other. For example, when the femto terminal is verified to be registered to a CSG, the femto base station may allow the link connection request.

In operation 520, the femto base station may transmit a downlink signal to the femto terminal at a maximum power in response to a link formed between the femto base station and the femto terminal. When the link connection request is allowed, the link may be formed.

Each macro terminal may include a channel state of a downlink in a CQI of an uplink and thereby report the channel state to a macro base station. Each of all the macro terminals may generate a list of information on an adjacent cell, such as an active cell and a neighbor through a measurement, or may maintain and update a list of information based on a downlink control channel. When a predetermined macro terminal is absent in a CSG list of a predetermined femto base station, the predetermined macro terminal may receive CCI from the femto base station.

In operation 530, the femto base station may receive an HII report of a macro terminal. In detail, the femto base station may receive information of a macro terminal located around the femto base station. The femto base station may receive information of the neighboring macro terminal through a macro base station. When ICI is greater than or equal to a threshold as expressed by Equation 1, the macro terminal may report an HII to the macro base station through an uplink and thereby notify an interference circumstance. In this example, the femto base station may receive an HII report from the macro base station. When the macro terminal to report the HII is absent around the femto base station, the femto base station may perform a general power control.

$$I_k^{fm} \geq I_{thresh} P_{noise} \qquad \text{[Equation 1]}$$

In Equation 1 and the following equations, $I_k^{fm}$ denotes interference from a femto base station against a k-th macro terminal, $I_{thresh}$ denotes a predetermined interference level at which a macro terminal may endure, and $P_{noise}$ denotes a UE noise figure.

A total amount of interference that the k-th macro terminal may receive from F femto base stations located around the k-th macro terminal may be expressed by Equation 2.

$$I_k^{fm} = \sum_{i=1}^{F} \frac{P_i^f}{L_{ik}^{fm}} \qquad \text{[Equation 2]}$$

In Equation 2 and the following equations, $P_i^f$ denotes a transmission power of an i-th femto base station among a total of F femto base stations, and $L_{ik}^{fm}$ denotes pathloss between an i-th femto base station and the k-th macro terminal and may be used to calculate a reception signal-to-interference and noise ratio (SINR) value of a user terminal.

In operation 530, the femto base station may control the power of the downlink signal in response to the HII report included in the received information of the macro terminal. For example, when a neighboring femto base station receives information of a macro terminal configured to transmit an HII to an uplink through an uplink receiver, it is possible to control a transmission power of each femto base station. Here, when the HII report is not included, that is, not received, the power control may be terminated. Here, the transmission power may indicate the power of the downlink signal.

In operation 531, the femto base station may decrease the transmission power. In detail, the femto base station may decrease the transmission power of the femto base station by a step of Δ in order to maintain QoS of the femto terminal, as expressed by Equation 3. For example, in response to the HII report, the femto base station may decrease the power of the downlink signal by a predetermined first unit magnitude. The predetermined first unit magnitude may be $\Delta P_1$.

In operation 532, the femto base station may determine whether the transmission power is greater than a required power. When the transmission power is greater than the required power, the femto base station may decrease the power of the downlink signal by the first unit magnitude. In detail, the femto base station may decrease the transmission power of the femto base station per each step until the transmission power of the femto base station becomes a minimum value satisfying Equation 4. The minimum value is greater than the required power of the femto base station.

$$P_l^f = P_{l-1}^f - \Delta P_1 \qquad \text{[Equation 3]}$$

$$P_l^f > P_{FUE\_Required} \qquad \text{[Equation 4]}$$

In Equation 3, Equation 4, and the following equations, $P_0 = P^{fmax}$ denotes an initial transmission power of a femto base station, $P^{fmax}$ denotes a maximum transmission power of the femto base station, and $P_l^f$ denotes a transmission power of the femto base station at an l-th iteration. Also, $\Delta P_l$ denotes a power control step in response to an HII report and $P_{FUE\_Required}$ denotes a required power of the femto base station.

In operation 533, the femto base station may allocate the transmission power not to be less than or equal to the required power. In detail, when a transmission power at an l-th iteration is less than a required power, a transmission power at an (l-1)-th iteration may be allocated as the power of the downlink signal.

In operation 540, the femto base station may verify whether the HII report is received from the macro terminal. In this example, when the HII report is received in a state in which the power of the downlink signal is decreased up to the predetermined required power, it is possible to control the power of the downlink signal based on a priority of service while satisfying predetermined constraints. When the HII report is not received, a power control procedure may be terminated.

In detail, when an HII report is continuously received from a macro terminal under interference from a femto base station regardless of that a reception power of a femto terminal is less than or equal to a required power by a power control applied to the femto base station, the femto base station may initiate a power control procedure based on a priority of service of a user terminal.

According to an embodiment, constraints predetermined with respect to a macro terminal and a femto terminal during a power control procedure for decreasing a transmission power of a femto base station may include constraints on interference, power, and SINR. For example, in the case of a femto terminal, constraints on the interference may be expressed by Equation 5.

$$I_n^{mf}+I_j^{ff}\leq I_{thresh}P_{noise} \quad \text{[Equation 5]}$$

In Equation 5 and the following equations, $I_n^{mf}$ denotes interference from an n-th macro base station against a femto terminal and $I_j^{ff}$ denotes interference from a neighboring femto base station against a j-th femto terminal.

$$I_j^{ff} = \sum_{i=1, i\neq j}^{F} \frac{P_i^f}{L_{ij}^{ff}} \quad \text{[Equation 6]}$$

In Equation 6 and the following equations, $L_{ij}^{ff}$ denotes pathloss between an i-th femto base station and the j-th femto terminal and may be used to calculate a reception SINR value of a femto terminal.

According to an embodiment, interference from a neighboring macro base station against a femto terminal may be expressed by Equation 7.

$$I_j^{mf} = \sum_{n=1}^{N} \frac{P_n^m}{L_{nj}^{mf}} \quad \text{[Equation 7]}$$

In Equation 7 and the following equations, $L_{nj}^{mf}$ denotes a pathloss between an n-th macro base station and the j-th femto terminal, and may be used to calculate a reception SINR value of the femto terminal.

According to an embodiment, constraints predetermined at a femto base station may be expressed by Equation 8.

$$\min\Sigma_j P_j^f \quad \text{[Equation 8]}$$

An SINR to satisfy both QoS of a macro terminal and QoS of a femto terminal may be expressed by Equation 9 and Equation 10.

$$\gamma_{MUE}^k \geq \gamma_{MUE}^{k\_thr} \quad \text{[Equation 9]}$$

$$\gamma_i^j \geq \gamma_i^{j\_thr} \quad \text{[Equation 10]}$$

In Equation 9, Equation 10, and the following equations, 'thr' denotes a minimum required SINR at each user terminal, $\gamma_{MUE}^k$ denotes an SINR of a k-th macro terminal, and $\gamma_i^j$ denotes an SINR of a j-th femto terminal of an i-th femto base station.

In operation 541, the femto base station may compare a priority of service of the macro terminal and a priority of service of the femto terminal. Unless the priority of service of the macro terminal is above the priority of service of the femto terminal, the power control procedure of the downlink signal may be terminated.

According to an embodiment, a priority of service of a user terminal may be defined by a macro base station by referring to a bearer model of FIG. 2. Further, the priority of service defined in Table 1 may be used to classify a service based on a QoS class identifier (QCI).

TABLE 1

| QCI | Resource Type | Priority | Packet Delay Budget(ms) | Packet Error Loss Rate | Example Services |
|---|---|---|---|---|---|
| 1 | GBR | 2 | 100 | $10^{-2}$ | Interactive speech |
| 2 | GBR | 4 | 150 | $10^{-3}$ | Interactive video (real-time streaming) |
| 3 | GBR | 5 | 300 | $10^{-6}$ | Non-interactive video (buffer streaming) |
| 4 | GBR | 3 | 50 | $10^{-3}$ | Real-time game |
| 5 | Non-GBR | 1 | 100 | $10^{-6}$ | IMS signal |
| 6 | Non-GBR | 7 | 100 | $10^{-3}$ | Speech, video (streaming), interactive game |
| 7 | Non-GBR | 6 | 300 | $10^{-6}$ | Video (buffer streaming) |
| 8 | Non-GBR | 8 | 300 | $12^{-6}$ | TCP based (Internet), chat, FTP, P2P file sharing, evolved video, and others |
| 9 | Non-GBR | 9 | | | |

According to an embodiment, a macro base station may have information on a bearer model used at a user terminal, and may be enabled through the QoS-MAC scheduler 310 within the macro base station of FIG. 3. As described above, FIG. 4 illustrates a functional block within a 3GPP PCC framework and a bearer may classify traffic having different QoS requirements. In FIG. 4, the PCRF 434 refers to a policy server within an EPC and may make a policy decision based on a PCC rule. Also, a power control method to mitigate interference in a heterogeneous network may collect information required at L1 of a femto base station system and may be configured as one of SON functions on L2 and L3 software.

According to an embodiment, a macro base station may broadcast information on a service of a macro terminal to a downlink and a femto base station may receive such information using a sniffer function within the femto base station. The femto base station may already have information on a service of the femto terminal.

When the priority of service of the macro terminal is above the priority of service of the macro terminal, the femto base station may decrease the power of the downlink signal in operation 542. In this example, when the macro terminal has a priority of service above the femto terminal, the femto base station may decrease the transmission power as expressed by Equation 11. In detail, the femto base station may decrease the power of the downlink signal by a predetermined second unit magnitude. Here, the second unit magnitude may be expressed as $\Delta P_2$ in Equation 11.

$$P_l^f = P_{l-1}^f - \Delta P_2 \quad \text{[Equation 11]}$$

In Equation 11, $P_l^f$ denotes a transmission power of a femto base station at an l-th iteration and $\Delta P_2$ denotes a power control amount per iteration. According to an embodiment, the femto base station may decrease the power of the downlink signal by a predetermined second unit magnitude less than or equal to the predetermined first unit magnitude. For example, using $\Delta P_1 \geq \Delta P_2$, a link of the femto terminal may be maximally maintained although the femto terminal is provided with a service falling short of a priority of service requested by the femto terminal.

In operation 543, the femto base station may verify whether the macro terminal satisfies an SINR constraint. Here, the femto base station may decrease the transmission power until the SINR constraint of Equation 12 is satisfied. The macro terminal that satisfies Equation 12 may not transmit an HII report any more.

$$SINR_{MUE} \geq SINR_{MUE\_Required} \quad \text{[Equation 12]}$$

In Equation 12, $SINR_{MUE}$ denotes a reception SINR of the macro terminal and $SINR_{MUE\_Required}$ denotes a required SINR of the macro terminal.

In operation 544, the femto base station may verify whether an CQI value of the macro terminal is increased.

In operation 545, the femto base station may increase the power of the downlink in response to the increase in the CQI value in information of the macro terminal. For example, when a macro terminal under interference from the femto base station becomes away from the femto base station, a CQI value to be reported to the uplink may increase. In this case, the transmission power may increase as expressed by Equation 13.

$$P_f = P_{f-1} + \Delta P_2 \quad \text{[Equation 13]}$$

In operation 546, the femto base station may verify whether the HII report is received after the power of the downlink signal is increased in operation 545. For example, an HII report and a CQI report from the corresponding macro terminal may be continuously observed after increasing the transmission power. Accordingly, when the HII report is received again, the transmission power may be decreased as expressed by Equation 11. As another example, when the HII report is not received, a CQI may be observed. In response to an increase in a CQI value, the transmission power may be increased as expressed by Equation 13.

Conversely, when the CQI value is not increased, the femto base station may wait for a subsequent CQI report using a transmission power of a current state in operation 548. For example, the femto base station may verify whether a subsequent CQI value is increased or decreased, at the transmission power of the current state.

When the femto terminal satisfies the SINR constraint based on Equation 14 in operation 547, the femto base station may terminate a power control procedure for mitigating interference in a heterogeneous network. Conversely, when the femto terminal does not satisfy the SINR constraint, operation 544 may be performed again to verify whether the CQI value is increased. Alternatively, the power of the downlink signal may be decreased until the SINR constraint among the predetermined constraints is satisfied.

$$SINR_{FUE} \geq SINR_{FUE\_Required} \quad \text{[Equation 14]}$$

In Equation 14, $SINR_{FUE}$ denotes a reception SINR of a femto terminal and $SINR_{FUE\_Required}$ denotes a required SINR of the femto terminal.

Figure 6:
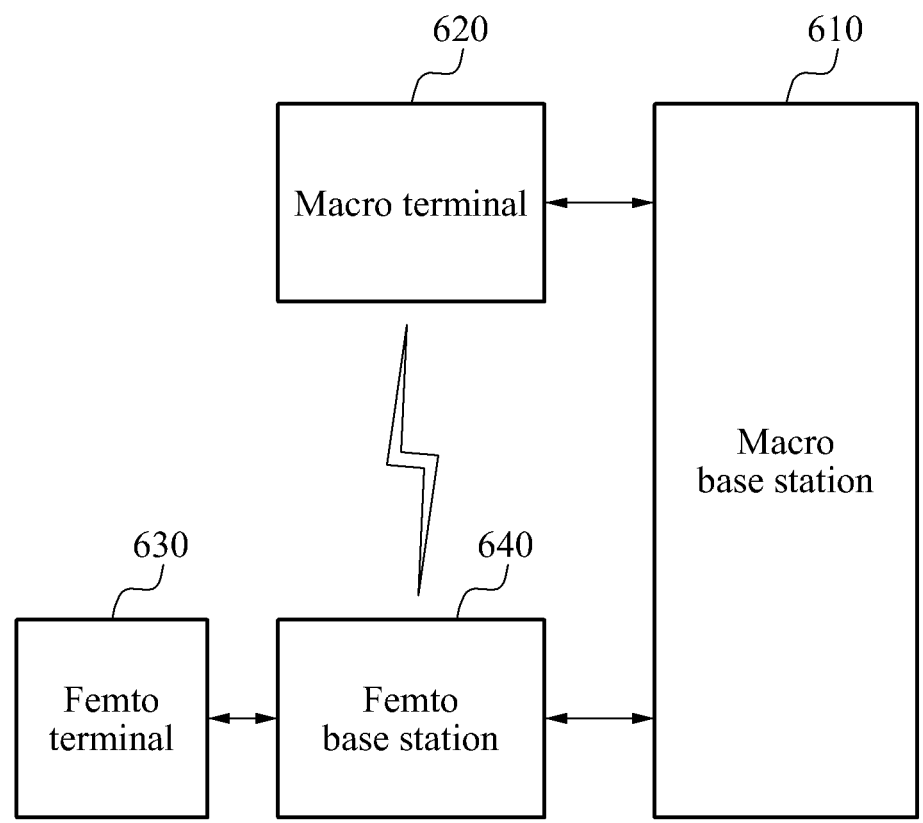
FIG. 6 is a block diagram illustrating a system to mitigate interference in a heterogeneous network according to an embodiment.

FIG. 6 is a block diagram illustrating a system 600 to mitigate interference in a heterogeneous network according to an embodiment. Referring to FIG. 6, the system 600 to mitigate interference in the heterogeneous network may include a macro base station 610, a macro terminal 620, a femto terminal 630, and a femto base station 640.

The macro base station 610 may transmit information of the macro terminal 620 to the femto base station 640. Information of the macro terminal 620 may include an HII report and a CQI report.

The macro terminal 620 may be connected to the macro base station 610 and may report a channel state of a downlink to the macro base station 610 using a CQI. When interference from the femto base station 640 is greater than or equal to a threshold, the macro terminal 620 that is not registered to a CSG may transmit the HII report to the macro base station 610.

The femto terminal 630 may transmit a link connection request to the femto base station 640. When the femto terminal 630 is verified to be registered to the CSG, the femto base station 640 may allow the link connection request.

When the link connection request is allowed, the femto base station 640 may transmit a downlink signal at the maximum power. In response to receiving the HII report in information of the macro terminal 620, the femto base station 640 may control a power of the downlink signal based on a priority of service while satisfying predetermined constraints.

When a priority of service of the macro terminal 620 is above a priority of service of the femto terminal 630, the femto base station 640 may decrease the power of the downlink signal. When the priority of service of the macro terminal 620 is above the priority of service of the femto terminal 630, the femto base station 640 may decrease the power of the downlink signal by a predetermined second unit magnitude.

The femto base station 640 may increase the power of the downlink signal in response to an increase in a CQI value in information of the macro terminal 620.

The femto base station 640 may decrease the power of the downlink signal until an SINR constraint among the predetermined constraints is satisfied.

In response to receiving the HII report, the femto base station 640 may decrease the power of the downlink signal by a predetermined first unit magnitude.

According to an embodiment, the femto base station 640 may include a non-transitory computer-readable storage medium storing at least one program including commands to perform a power control method to mitigate interference in a heterogeneous network.

According to an embodiment, it is possible to simultaneously guarantee interference mitigation and QoS in such a manner that the femto base station 640 applies, as a criterion, a priority of service to a power control procedure among SON functions.

According to an embodiment, it is possible to enhance QoS of the entire system 600 by sacrificing a user terminal having a relatively low priority of service between the macro terminal 620 and the femto terminal 630.

According to an embodiment, it is possible to minimize interference occurring in a heterogeneous network by applying an effective power control procedure to various types of services.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present disclosure is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A power control method to mitigate interference in a heterogeneous network, the method comprising:
   receiving a link connection request from a femto terminal;
   transmitting a downlink signal when the link connection request is allowed;
   receiving information of a macro terminal present around a femto base station;
   controlling a power of the downlink signal in response to a first high interference indicator (HII) report being included in the received information of the macro terminal;
   controlling the power of the downlink signal based on a priority of service while satisfying predetermined constraints when a second HII report is transmitted to the femto base station and the power of the downlink signal is decreased up to a predetermined required power of the femto terminal; and
   increasing the power of the downlink signal when a channel quality indicator (CQI) value in the received information of the macro terminal increases,
   wherein the receiving the link connection request comprises allowing the link connection request when the femto terminal is verified to be registered to a closed subscriber group (CSG).

2. The method of claim 1, wherein the controlling the power of the downlink signal in response to the first HII report comprises decreasing the power of the downlink signal by a predetermined first unit magnitude in response to the first HII report.

3. The method of claim 1, wherein the controlling the power of the downlink signal based on the priority of service comprises:
   comparing a priority of service of the macro terminal and a priority of service of the femto terminal; and
   decreasing the power of the downlink signal when the priority of service of the macro terminal is above the priority of service of the femto terminal.

4. The method of claim 3, wherein the decreasing the power of the downlink signal comprises decreasing the power of the downlink signal by a predetermined second unit magnitude.

5. The method of claim 3, wherein the decreasing the power of the downlink signal comprises decreasing the power of the downlink signal by a predetermined second unit magnitude that is less than or equal to a predetermined first unit magnitude.

6. The method of claim 1, wherein the controlling the power of the downlink signal based on the priority of service comprises decreasing the power of the downlink signal until a signal-to-interference and noise ratio (SINR) constraint among the predetermined constraints is satisfied.

7. The method of claim 1, wherein the receiving information of the macro terminal comprises receiving the information of the macro terminal through a macro base station.

8. A power control system to mitigate interference in a heterogeneous network, the power control system comprising:
   a macro base station configured to transmit information of a macro terminal to a femto base station;
   the macro terminal connected to the macro base station and configured to report a channel state of a downlink to the macro base station using a channel quality indicator (CQI);
   a femto terminal configured to transmit a link connection request to the femto base station; and
   the femto base station configured to transmit a downlink signal when the link connection request is allowed, to receive the information of the macro terminal present around the femto base station, to control a power of the downlink signal in response to a first high interference indicator (HII) report being included in the received information of the macro terminal, and to control the power of the downlink signal based on a priority of service while satisfying predetermined constraints when a second HII report is transmitted to the femto base station and the power of the downlink signal is decreased up to a predetermined required power of the femto terminal,
   wherein when a CQI value in the information of the macro terminal increases, the femto base station is configured to increase the power of the downlink signal, and
   wherein when the femto terminal is verified to be registered to a closed subscriber group (CSG), the femto base station is configured to allow the link connection request.

9. The power control system of claim 8, wherein when the macro terminal is not registered to a closed subscriber group (CSG) and when interference from the femto base station is greater than or equal to a threshold, the macro terminal is configured to transmit the first HII report to the macro base station.

10. The power control system of claim 8, wherein when a priority of service of the macro terminal is above a priority of service of the femto terminal, the femto base station is configured to decrease the power of the downlink signal.

11. The power control system of claim 8, wherein when a priority of service of the macro terminal is above a priority of service of the femto terminal, the femto base station is configured to decrease the power of the downlink signal by a predetermined second unit magnitude.

12. The power control system of claim 8, wherein the femto base station is configured to decrease the power of the downlink signal until a signal-to-interference and noise ratio (SINR) among the predetermined constraints is satisfied.

13. The power control system of claim 8, wherein, in response to the first HII report, the femto base station is configured to decrease the power of the downlink signal by a predetermined first unit magnitude.

14. A non-transitory computer-readable storage medium storing at least one program including instructions, which uses a processor to implement a power control method to mitigate interference in a heterogeneous network, the method comprising:
   receiving a link connection request from a femto terminal;
   transmitting a downlink signal when the link connection request is allowed;
   receiving information of a macro terminal present around a femto base station;
   controlling, using the processor, a power of the downlink signal in response to a first high interference indicator (HII) report being included in the received information of the macro terminal;
   controlling, using the processor, the power of the downlink signal based on a priority of service while satisfying predetermined constraints when a second HII report is transmitted to the femto base station and the power of the downlink signal is decreased up to a predetermined required power of the femto terminal; and
   increasing the power of the downlink signal when a channel quality indicator (CQI) value in the received information of the macro terminal increases,
   wherein the receiving the link connection request comprises allowing the link connection request when the femto terminal is verified to be registered to a closed subscriber group (CSG).

15. A power control method to mitigate interference in a heterogeneous network, the method comprising:
   receiving a link connection request from a femto terminal;
   transmitting a downlink signal when the link connection request is allowed;
   receiving information of a macro terminal present around a femto base station from a macro base station;
   controlling a power of the downlink signal in response to a first high interference indicator (HII) report being included in the received information of the macro terminal;
   controlling the power of the downlink signal based on a priority of service while satisfying predetermined constraints, in response to a second HII report in a state in which the power of the downlink signal is decreased up to a predetermined required power; and
   increasing the power of the downlink signal when a channel quality indicator (CQI) value in the received information of the macro terminal increases,
   wherein the receiving the link connection request comprises allowing the link connection request when the femto terminal is verified to be registered to a closed subscriber group (CSG), and
   wherein the priority of service is defined based on a Bearer model by the macro station.

* * * * *